United States Patent Office 3,530,125
Patented Sept. 22, 1970

3,530,125
THIAZINOBENZOTHIAZINE CARBAMATES
Betty H. Tarnowski, Midland, Mich., assignor to The Dow Chemical Company, Midland, Mich., a corporation of Delaware
No Drawing. Filed June 3, 1968, Ser. No. 733,761
Int. Cl. C07d 93/12
U.S. Cl. 260—243          4 Claims

ABSTRACT OF THE DISCLOSURE

Disclosed are 2,3,5,6 - tetrahydro - (1,4)-thiazino(4,3,2-de)(1,4) - benzothiazin-9-yl carbamate 1,1,7,7-tetraoxides in which the carbamate nitrogen is substituted with lower alkyl or phenyl, and the 8-methyl and 8-methoxy derivatives thereof. These compounds are useful as pesticides. Intermediates for the production of these useful compounds, 2,3,5,6-tetrahydro - (1,4)-thiazino-(4,3,2-de)(1,4)-benzothiazin-9-ol 1,1,7,7 - tetraoxide and the 8-methyl and 8-methoxy derivatives thereof are also disclosed.

The present invention relates to certain novel and useful 2,3,5,6-tetrahydro - (1,4) - thiazino(4,3,2-de)(1,4)-benzothiazin-9-yl carbamate 1,1,7,7 - tetraoxides which can be represented by the following Formula III:

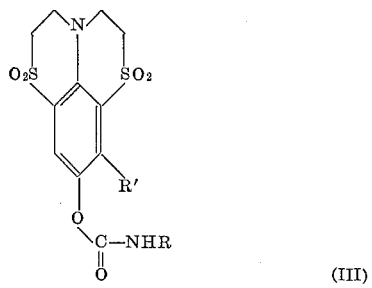

(III)

In this and succeeding formulas, R represents lower alkyl or phenyl and R' represents hydrogen, methyl, or methoxy.

The term "lower alkyl," as employed in the present specification and claims, designates an alkyl group containing 1 to 2, to 3, and up to and including 4 carbon atoms, and 1, and 2, and 3, and 4 carbon atoms, that is to say, methyl, ethyl, n-propyl, isopropyl, n-butyl, isobutyl, s-butyl and t-butyl.

For the sake of simplicity and convenience the new compounds of the present invention will be referred to as thiazinobenzothiazine carbamates. These described products are crystalline solids which are soluble in many common organic solvents. They are useful as pesticides for the control of various organisms and particularly for the control of arachnids and insects, such as mites, roaches, beetles, and flies. Representative thiazinobenzothiazine carbamates include:

2,3,5,6-tetrahydro-8-methoxy-(1,4)-thiazino(4,3,2-de)
 (1,4)-benzothiazin-9-yl N-methyl carbamate 1,1,7,7-tetraoxide,
2,3,5,6-tetrahydro-8-methyl-(1,4)-thiazino(4,3,2-de)
 (1,4)-benzothiazin-9-yl N-(n-propyl)carbamate
 1,1,7,7-tetraoxide,
2,3,5,6-tetrahydro-8-methyl-(1,4)-thiazino(4,3,2-de)
 (1,4)-benzothiazin-9-yl N-isobutylcarbamate
 1,1,7,7-tetraoxide,
2,3,5,6-tetrahydro-8-methoxy-(1,4)-thiazino(4,3,2-de)
 (1,4)-benzothiazin-9-yl N-isobutylcarbamate
 1,1,7,7-tetraoxide,
2,3,5,6-tetrahydro-(1,4)-thiazino-(4,3,2-de)(1,4)-
 benzothiazin-9-yl N-isopropylcarbamate
 1,1,7,7-tetraoxide,
2,3,5,6-tetrahydro-8-methoxy-(1,4)-thiazino(4,3,2-de)
 (1,4)-benzothiazin-9-yl N-isopropylcarbamate
 1,1,7,7-tetraoxide,
2,3,5,6-tetrahydro-(1,4)-thiazino-(4,3,2-de)(1,4)-
 benzothiazin-9-yl N-(n-butyl)carbamate
 1,1,7,7-tetraoxide,
2,3,5,6-tetrahydro-8-methyl-(1,4)-thiazino-(4,3,2-de)
 (1,4)-benzothiazin-9-yl N-(n-butyl)carbamate
 1,1,7,7-tetraoxide, and
2,3,5,6-tetrahydro-8-methoxy-(1,4)-thiazino-(4,3,2-de)
 (1,4)-benzothiazin-9-yl N-phenylcarbamate
 1,1,7,7-tetraoxide.

The novel thiazinobenzothiazine carbamates of the present invention can be prepared according to the following scheme:

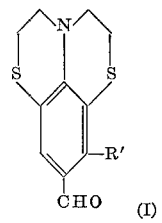

(I)

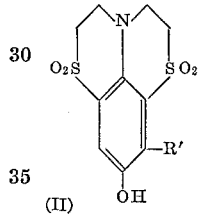

(II)

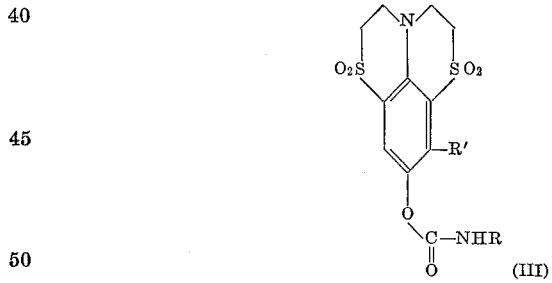

(III)

With respect to the above scheme, the thiazinobenzothiazine-9-carboxaldehydes (I) are oxidized with an oxidizing agent to form the dioxides of each of the two ring sulfur atoms and concomitantly replace the 9-carboxaldehyde group with a hydroxy group. These derivatives are represented above by Formula II. Upon treatment of these latter 9-hydroxy oxides (II) with a substituted isocyanate, the product 9-carbamates (III) hereof are formed.

Those intermediates depicted in the foregoing scheme by Formula II represent another novel compound aspect of the present invention. These thiazinobenzothiazin-9-ol 1,1,7,7-tetraoxide compounds are novel and are useful in the preparation of the pesticide final products hereof in accordance with the preparative method disclosed.

With further and more particular reference to the above scheme and the preparative methods hereof it represents, the first step involves oxidizing a thiazinobenzothiazine carboxaldehyde of Formula I to the corresponding thiazinobenzothiazin-9-ol 1,1,7,7-tetraoxide which compounds correspond to Formula II, with an oxidizing agent, which include, representatively, hydrogen peroxide, peroxymonophthalic acid, peroxymonosulfuric acid, and perbenzoic acid. These oxidized products represent essentially five oxidative steps or plateaus. Thus, this reaction requires five molecules of oxidizing agent per molecule of starting compound or, one molecular proportion of the thiazinobenzothiazine carboxaldehyde is reacted with an amount of oxidizing agent sufficient to supply 5 atoms of oxygen. In carrying out the oxidation reaction to prepare these intermediates of the present invention, it is preferable to employ the oxidizing agent in such amounts as will provide oxygen in the stoichiometric quantities required for the preparation of the product. In some instances, the use of a slight excess of the oxidizing agent is preferred.

Hydrogen peroxide, and conveniently a solution thereof with glacial acetic acid, is the oxidizing agent of choice in the production of the oxides of the present invention. In a preferred procedure, the glacial acetic acid is employed as the liquid reaction medium for the oxidation with hydrogen peroxide. The reaction takes place at temperatures of from about 30° C. to about 100° C. In a convenient method, the reaction is carried out at between 40° C. and 80° C. In carrying out the reaction, the reactants are contacted in any order or fashion, and preferably in amounts stoichiometric for the preparation of the desired product. The reaction mixture is then maintained at a temperature within the reaction temperature range for a short period of time. Following the reaction period, the thiazinobenzothiazine oxide product is dissolved by the addition of an aqueous base, such as an ammonium hydroxide solution, to the reaction mixture. The resultant solution can then be filtered and the filtrate acidified to precipitate the product. Alternatively, the prodct can be recovered by quenching the reaction mixture in ice water and thereafter isolating the resulting solid as above described.

By employing similar procedures and reaction conditions as described above, peracetic acid or perbenzoic acid can be employed to prepare the thiazinobenzothiazine oxides hereof. In a preferred procedure, the oxidizing agent is employed in quantities slightly in excess of the theoretical quantities consumed by the reaction in the preparation of the desired product. Conveniently, these reactions are conducted in a liquid medium, a solution of the oxidizing agent in, for example, acetic acid being satisfactorily used as the transfer medium for this reactant to the reaction mixture.

In the preparation of the thiazinobenzothiazine carbamate (III) product hereof from the corresponding intermediate 9-hydroxy oxide (II), the latter is reacted together with a substituted isocyanate of the Formula II-a:

$$R-N=C=O \qquad (II-a)$$

Conveniently, the reaction between the thiazinobenzothiazin-9-ol 1,1,7,7-tetraoxide and the isocyanate is carried out in a liquid reaction medium which is inert to and does not compete with the reactants. Representative media for such purposes include methylene chloride, dimethylformamide, tetrahydrofuran and the like. The reaction is catalyzed by small and catalytic amounts of tertiary amines such as pyridine and the trialkylamines, trimethylamine, triethylamine and tributylamine or such catalysts as dibutyltindilaurate, dibutyltindipropionate, dibutyltindibutyrate, and the like. Where optimum yields and minimal reaction periods are desired, the reaction is carried out while employing such a catalyst. The reaction proceeds smoothly at the temperature range of from 0° to 70° C. Some of the isocyanate starting materials boil within this range so that the temperatures to be employed with such isocyanates are those which are compatible with their boiling temperatures. The amounts of the reactants to be employed are not critical, some of the desired products being obtained when employing any proportions of the reagents. However, the reaction consumes the reagents in the proportion of one mole of thiazinobenzothiazin-9-ol 1,1,7,7-tetraoxide with each mole of isocyanate and the employment of such proportions or an excess of the isocyanate in the amount of up to two to four moles or more of isocyanate is usually preferred.

In carrying out the reaction, the thiazinobenzothiazin-9-ol 1,1,7,7-tetraoxide, isocyanate and catalyst, if employed, are mixed together in any convenient manner. In a preferred procedure, the isocyanate is added portionwise to the benzothiazin-9-ol 1,1,7,7-tetraoxide and catalyst, if employed, dispersed in a liquid reaction medium. The mixing and contacting of such reagents is carried out at a temperature of from 0° to 70° C. and preferably at a temperature of from about 15° to 70° C. Following the contacting of such reagents, the reaction mixture can be set aside for a period of time to ensure completion of the reaction. Upon completion of the reaction, the reaction mixture is processed as previously described to separate and isolate the desired products.

The following examples serve further to typify the nature of the present invention and the manner by which it can be practiced but, as such, are not to be construed as limitations upon the overall scope hereof.

EXAMPLE 1

A solution of 20.0 grams (0.084 mole) of 2,3,5,6-tetrahydro-(1,4)-thiazino-(4,3,2 - de)(1,4) - benzothiazine-9-carboxaldehyde, which is dispersed in 100 milliliters of glacial acetic acid, is warmed to 60° C. with stirring. To this warmed solution is added, dropwise, 57.4 grams (0.506 mole) of 30 percent hydrogen peroxide. This addition is carried out at a rate such that the temperature of the reaction mixture does not exceed 65° C. Thereafter, the reaction mixture is stirred at 60° C. for 24 hours. The warm mixture is filtered and the filtrate is poured into ice water which precipitates a tan solid melting at 253° C. (with decomposition). This solid is collected by filtration and the filtrate is concentrated to about 500 milliliters. This concentrate is allowed to stand at room temperature during which time it yields tan-rust crystals melting at 285° C. (with decomposition) and tan crystals melting at 291° C. (with decomposition). The three crops are combined and slurried in 200 milliliters of water. The pH of the resultant mixture is adjusted to strongly basic by the addition of sodium hydroxide. The mixture is then filtered and the filtrate is acidified giving a yellow-tan precipitate melting at 260° C. (with decomposition). This precipitate is collected by filtration, boiled in acetone, and filtered. Petroleum ether (B.P. 60°–70° C.) is added to the cooled filtrate to give tan prisms melting at 294° C. (with decomposition) and these are recrystallized from a minimum amount of acetone to give the desired 2,3,5,6-tetrahydro-(1,4)-thiazino - (4,3,2-de)(1,4)-benzothiazin-9-ol 1,1,7,7-tetraoxide product as yellow prisms having a melting point of 295° C. (with decomposition).

*Elemental analysis.*—Calculated for $C_{10}H_{11}NO_5S_2$ (percent): C, 41.51; H, 3.83; N, 4.84; S, 22.16. Found (percent): C, 41.25; H, 3.80; N, 4.75; S, 22.45.

EXAMPLE 2

2,3,5,6-tetrahydro-(1,4) - thiazino - (4,3,2-de)(1,4)-benzothiazin-9-ol 1,1,7,7-tetraoxide (0.7 gram; 0.0024 mole) is dispersed in 25 milliliters of dimethylformamide at room temperature. To the resultant solution is added a small piece of dibutyltindilaurate. The mixture is then stirred at room temperature and, while maintaining these conditions, there is added, portionwise, 3 milliliters (0.048 mole) of methyl isocyanate over a period of about 10 minutes. Stirring is continued at room temperature for 3 hours and the reaction mixture is then set aside overnight. Following this period, the mixture is poured into ice water which initiates precipitation. The resultant mixture is filtered and the collected solid is dried and recrystallized from nitromethane to obtain the desired 2,3, 5,6-tetrahydro-(1,4)-thiazino-(4,3,2-de)(1,4)-benzothiazin-9-yl N-methylcarbamate 1,1,7,7-tetraoxide product as light yellow prisms having a melting point of 238° C. (with decomposition).

*Elemental analysis.*—Calculated for $C_{12}H_{14}N_2O_6S_2$ (percent): C, 41.61; H, 4.07; N, 8.09. Found (percent): C, 41.60; H, 4.05; N, 8.17.

EXAMPLE 3

2,3,5,6-tetrahydro-(1,4)-thiazino-(4,3,2-de)(1,4)-benzothiazin-9-ol 1,1,7,7-tetraoxide (10 grams; 0.029 mole) and 4 drops of triethylamine are dispersed in 325 milliliters of methylene chloride. To the resultant mixture is slowly added with stirring 3.5 grams (0.061 mole) of methyl isocyanate. This addition takes place over a period of 15 minutes and at room temperature. After allowing the resulting mixture to stand at room temperature for 3 days, it is evaporated under vacuum to dryness. The resulting residue is recrystallized three times from a mixture of diethyl ether and petroleum ether (boiling at 60° to 70° C.) to obtain the desired 2,3,5,6-tetrahydro-(1,4)-thiazino-(4,3,2-de)(1,4)-benzothiazin-9-yl N-methylcarbamate 1,1,7,7-tetraoxide product.

EXAMPLE 4

Ten grams (0.029 mole) of 2,3,5,6-tetrahydro-(1,4)-thiazino-(4,3,2-de)(1,4)-benzothiazin-9-ol 1,1,7,7-tetraoxide is dispersed in 300 milliliters of dimethylformamide. To this mixture is gradually added 4.3 grams (0.075 mole) of ethyl isocyanate over a 30 minute period. The resultant mixture is stirred an additional 30 minutes and is then set aside for 2 days. During this entire period, the temperature of the mixture is maintained at from 20° to 30° C. Upon subesquent evaporation of solvent, the residue is recrystallized from toluene:diethyl ether to provide the 2,3,5,6-tetrahydro-(1,4)-thiazino-(4,3,2-de)(1,4)-benzothiazin-9-yl N-ethylcarbamate 1,1,7,7-tetraoxide product. 2,3,5,6-tetrahydro-(1,4)-thiazino-(4,3,2-de)(1,4)-benzothiazin-9-yl N-ethylcarbamate 1,1,7,7-tetraoxide has a molecular weight of 360.4.

EXAMPLE 5

To a mixture of 15 grams (0.04 mole) of 2,3,5,6-tetrahydro-(1,4)-thiazino-(4,3,2-de)(1,4)-benzothiazin-9-ol 1,1,7,7-tetraoxide and 4 drops of triethylamine in 200 milliliters of methylene chloride are added, portionwise and with stirring over a 5 minute period, 10.7 grams (0.09 mole) of phenyl isocyanate and the resultant mixture is permitted to stand at room temperature for seven days. This mixture is then evaporated to dryness and the residue repeatedly recrystallized from benzene to provide the 2,3,5,6-tetrahydro-(1,4)-thiazino-(4,3,2-de)(1,4)-benzothiazin-9-yl N-phenylcarbamate 1,1,7,7-tetraoxide product. 2,3,5,6-tetrahydro-(1,4)-thiazino-(4,3,2-de)(1,4)-benzothiazin-9-yl N-phenylcarbamate 1,1,7,7-tetraoxide has a molecular weight of 396.4.

In procedures analogous to the foregoing and in accordance with the method of the present invention, the following compounds of the present invention are prepared:

2,3,5,6-tetrahydro-(1,4)-thiazino-(4,3,2-de)(1,4)-benzothiazin-9-yl N-(n-propyl)carbamate 1,1,7,7-tetraoxide which has a molecular weight of 374.4 by reacting together 2,3,5,6-tetrahydro-(1,4)-thiazino-(4,3,2-de)(1,4)-benzothiazin-9-ol 1,1,7,7-tetraoxide and n-propyl isocyanate.

2,3,5,6-tetrahydro-8-methyl-(1,4)-thiazino-(4,3,2-de)(1,4)-benzothiazin-9-yl N-methylcarbamate 1,1,7,7-tetraoxide which has a molecular weight of 359.4 by reacting together 2,3,5,6-tetrahydro-8-methyl-(1,4)-thiazino-(4,3,2-de)(1,4)-benzothiazin-9-ol 1,1,7,7-tetraoxide and methyl isocyanate.

2,3,5,6-tetrahydro-8-methoxy-(1,4)-thiazino-(4,3,2-de)(1,4)-benzothiazin-9-yl N-ethylcarbamate 1,1,7,7-tetraoxide which has a molecular weight of 391.4 by reacting together 2,3,5,6-tetrahydro-8-methoxy-(1,4)-thiazino-(4,3,2-de)(1,4)-benzothiazin-9-ol 1,1,7,7-tetraoxide and ethyl isocyanate.

2,3,5,6-tetrahydro-8-methyl-(1,4)-thiazino-(4,3,2-de)(1,4)-benzothiazin-9-yl N-phenylcarbamate 1,1,7,7-tetraoxide which has a molecular weight of 421.5 by reacting together 2,3,5,6-tetrahydro-8-methyl-(1,4)-thiazino-(4,3,2-de)(1,4)-benzothiazin-9-ol 1,1,7,7-tetraoxide and phenyl isocyanate.

2,3,5,6-tetrahydro-8-methyl-(1,4)-thiazino-(4,3,2-de)(1,4)-benzothiazin-9-ol 1,1,7,7-tetraoxide which has a molecular weight of 303.3 by oxidizing 2,3,5,6-tetrahydro-8-methyl-(1,4)-thiazino-(4,3,2-de)(1,4)-benzothiazine-9-carboxaldehyde with hydrogen peroxide.

2,3,5,6-tetrahydro-8-methoxy-(1,4)-thiazino-(4,3,2-de)(1,4)-benzothiazin-9-ol 1,1,7,7-tetraoxide which has a molecular weight of 319.4 by oxidizing 2,3,5,6-tetrahydro-8-methoxy-(1,4)-thiazino-(4,3,2-de)(1,4)-benzothiazine-9-carboxaldehyde with hydrogen peroxide.

The compounds of the present invention are useful as pesticides for the control of a number of arachnid and insect organisms such as mites, beetles, ticks and roaches. For such uses, the unmodified compounds can be employed. The compounds can also be dispersed on a finely divided solid and employed as a dust. Also, such mixtures can be dispersed in water with or without the aid of a surface active dispersing agent and the resulting aqueous suspension employed as a spray, drench, or wash. In other procedures, the compounds are employed as toxic constituents in solvent solutions, oil-in-water or water-in-oil emulsions, or aqueous dispersions. Good results are obtained with methods employing and compositions containing pesticidal amounts of the novel compounds. These amounts can range, generally, from 50 to 10,000 parts of the compound or mixtures thereof per million parts by weight.

As a representative operation, 2,3,5,6-tetrahydro-(1,4)-thiazino-(4,3,2-de)(1,4)-benzothiazin-9-yl N-methyl carbamate 1,1,7,7-tetraoxide gives good controls and kills of two-spotted spider mites when applied in the form of compositions at concentrations of 1000 parts of the active compound per million parts by weight.

The starting thiazinobenzothiazine carboxaldehydes (I) are prepared by reacting together a thiazinobenzothiazine of the formula

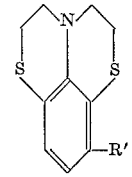

and methylformanilide and phosphorus oxychloride or dimethylformamide and phosphorus oxychloride. The reactants can be employed in any relative amount; however, the reaction consumes the reactants in the proportion of one mole of methylformanilide and phosphorus oxychloride or one mole of dimethylformamide and phosphorus oxychloride per mole of thiazinobenzothiazine starting material. The employment of such molecular proportions or an excess, upwards of two-fold, of each of the phosphorus oxychloride and methylformanilide or each of the phosphorus oxychloride and dimethylformamide reactants in comparison to the thiazinobenzothiazine starting material can thus be employed. The reactants can themselves be used as the entire reaction medium in which case, for example, the dimethylformamide is used in large excess. Alternatively, a liquid, inert solvent can be employed particularly when using methylformanilide as reactant in which case, for example, o-dichlorobenzene is a suitable solvent. The reaction proceeds rapidly at a temperature of from 0° C. or lower to about 100° C. or more and conveniently at temperatures of from 25° C. to 100° C.

In conducting this reaction, the thiazinobenzothiazine, methylformanilide or dimethylformamide, and phosphorus oxychloride reactants and solvent, if employed, are mixed together in any convenient fashion. In one manner, the thiazinobenzothiazine is added to a solution of the phosphorus oxychloride dispersed in the methylformanilide or dimethylformamide. This may be done at relatively low temperatures as from about 0° C. to 30° C. The reactants are then contacted and maintained together at a temperature of from 0° C. to 100° C., preferably, 25° C. to 100° C. for a period of time sufficient to produce the product, usually ranging from a few minutes to several hours, and generally with stirring. Sometimes it is convenient to raise the reaction mixture to the boiling temperature and maintain reflux for the duration of the reaction period. Upon reaction end, the products are recovered via conventional means such as precipitation. Precipitation can be induced by quenching the reaction mixture in water followed by neutralizing the resultant solution with, for example, sodium acetate and thereafter allowing the product to accumulate. Subsequent filtration and recrystallization, if desired, achieves the final separation and purification.

The respective thiazinobenzothiazine starting compounds are prepared by dissolving a N,N-bis(2-(substituted sulfonylthio)ethyl)aniline compound which corresponds to the formula

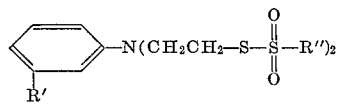

in which R″ represents lower alkyl, phenyl, or substituted phenyl in a polar organic solvent and thereafter heating the resulting solution at a temperature ranging from about 60° to about 130° C., preferably 70° C. to 100° C., to effect ring closure. In carrying out this method, the aniline compound is dispersed in a polar organic liquid such as ethanol or dimethylformamide and the reaction thus formed is heated at a temperature within the cited temperature range for at least 1 hour and generally until the desired product mixture, as measured by convenient analytical techniques, is obtained. Following the heating period, the reaction mixture is cooled to terminate the reaction. The desired product is then separated and recovered by such conventional techniques as filtration, decantation, extraction, chromatography, and the like.

The N,N,-bis(2-(substituted sulfonylthio)ethyl)-aniline compounds are prepared by reacting a dihalo compound of the formula

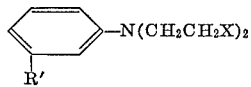

wherein X represents bromo or chloro with an alkali metal salt of a thiosulfonic acid of the formula

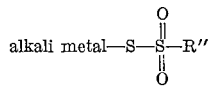

R″ being as above defined, in an organic reaction medium at temperatures of from 60° C. to 120° C. and preferably at the boiling point of the reaction mixture and under reflux. Following the reaction, the reaction mixture is filtered hot and the filtrate cooled to initiate precipitation of product which is removed by centrifugation, decantation, or filtration.

What is claimed is:

1. A member selected from the group consisting of a 2,3,5,6 - tetrahydro-(1,4)-thiazino-(4,3,2-de)(1,4)-benzothiazin-9-yl carbamate 1,1,7,7-tetraoxide in which the carbamate nitrogen is substituted with lower alkyl or phenyl and the 8-methyl or 8-methoxy derivatives thereof.

2. The compound claimed in claim 1 which is 2,3,5,6-tetrahydro - (1,4) - thiazino-(4,3,2-de)(1,4)-benzothiazin-9-yl N-methylcarbamate 1,1,7,7-tetraoxide.

3. The compound claimed in claim 1 which is 2,3,5,6-tetrahydro - (1,4) - thiazino-(4,3,2-de)(1,4)-benzothiazin-9-yl N-ethylcarbamate 1,1,7,7-tetraoxide.

4. A member selected from the group consisting of a 2,3,5,6 - tetrahydro-(1,4)-thiazino-(4,3,2-de)(1,4)-benzothiazin-9-ol 1,1,7,7-tetraoxide and the 8-methyl or 8-methoxy derivatives thereof.

References Cited

UNITED STATES PATENTS

| | | | |
|---|---|---|---|
| 2,947,744 | 8/1960 | Lowrie | 260—243 |
| 3,042,671 | 7/1962 | Lombardino et al. | 260—243 |
| 3,148,188 | 9/1964 | Hoya | 260—243 |

HENRY R. JILES, Primary Examiner

J. M. FORD, Assistant Examiner

U.S. Cl. X.R.

260—453, 999